March 5, 1957
C. H. LOWE
2,783,873
EGG HANDLING EQUIPMENT
Filed Nov. 30, 1953
3 Sheets-Sheet 1
FIG. 1.
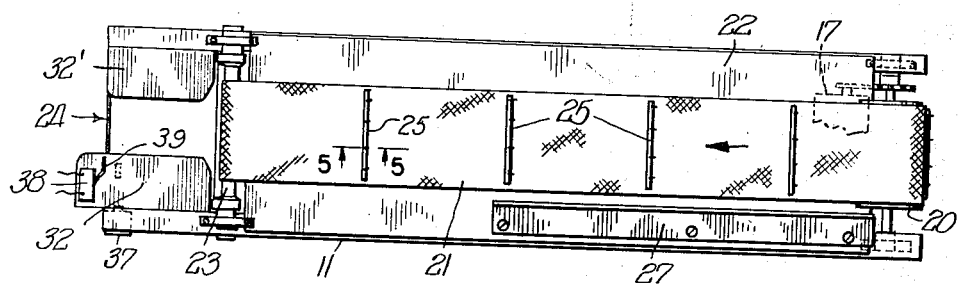
FIG. 2.
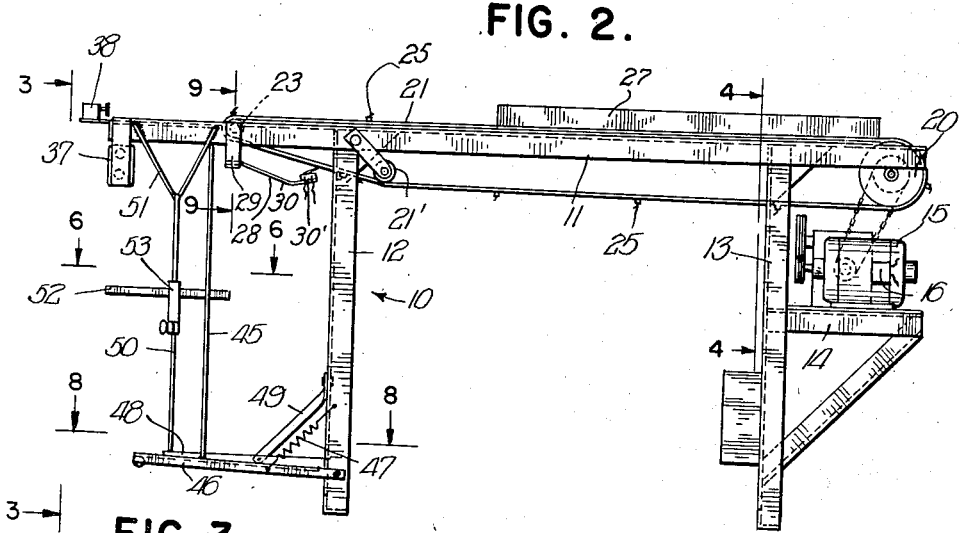
FIG. 3.
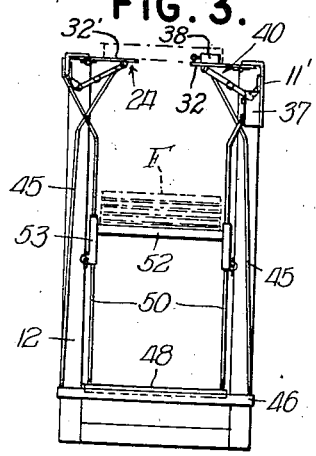
FIG. 5.
FIG. 4.
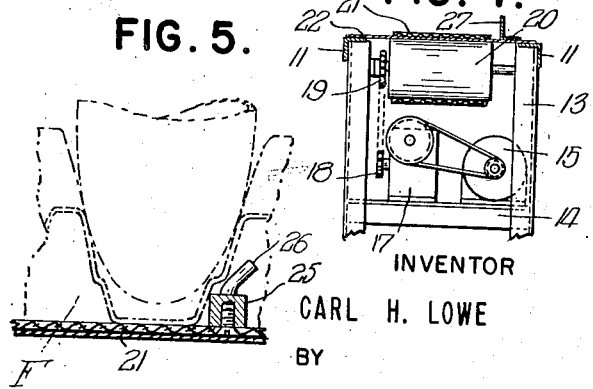
INVENTOR
CARL H. LOWE
BY
Cromwell, Greist + Warden
ATTORNEYS.

March 5, 1957 C. H. LOWE 2,783,873
EGG HANDLING EQUIPMENT
Filed Nov. 30, 1953 3 Sheets-Sheet 2
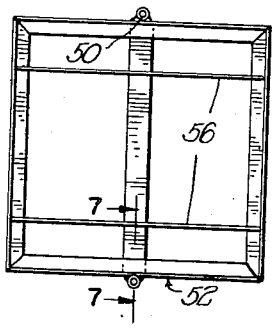
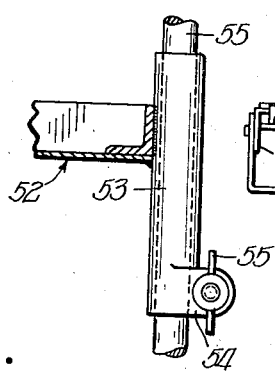
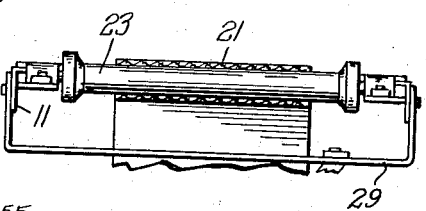
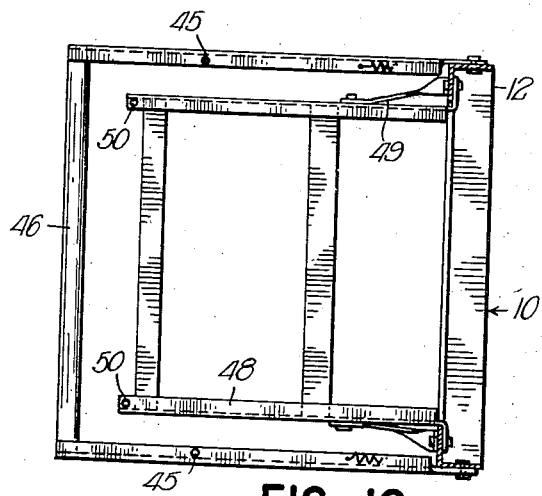
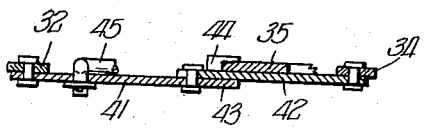
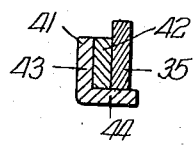
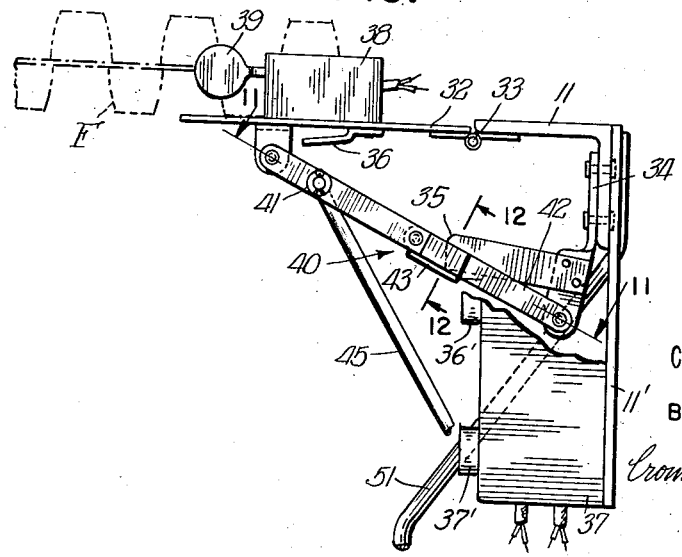
INVENTOR
CARL H. LOWE
BY
ATTORNEYS.

March 5, 1957

C. H. LOWE 2,783,873

EGG HANDLING EQUIPMENT

Filed Nov. 30, 1953

INVENTOR
CARL H. LOWE
BY
Cromwell Greist & Warden

ATTORNEYS

United States Patent Office 2,783,873
Patented Mar. 5, 1957

2,783,873

EGG HANDLING EQUIPMENT

Carl H. Lowe, San Mateo, Calif., assignor, by mesne assignments, to The Diamond Match Company, New York, N. Y., a corporation of Delaware Application November 30, 1953, Serial No. 395,104

10 Claims. (Cl. 198—232)

The present invention relates to an improved apparatus for the handling of containers of articles, specifically the handling of egg filler flats or trays in the candling of eggs in a commercial egg room. An improved piece of equipment is afforded for the automatically controlled transportation of a succession of egg filled flats to a candling station where an operator removes the eggs one by one from the flat, candles the same and then replaces acceptable eggs in a cellular carton, in which they are subsequently shipped and sold. The nature of the improvement is such that a single attendant at a feed-in or supply end of a number of the improved units may easily keep the respective candlers operating the same more than adequately supplied with trays of eggs to be candled.

Generally considered, the improved unit comprises an endless, longitudinally travelling conveyor designed to be installed and operated in an egg room to forward egg-filled flats or trays from a supply station to a candling station and, as indicated above, it is desirable that a bank of the units be arranged in parallel and be serviced by a single loading attendant. Each unit and its conveyor are operated under the sole control of a candler, as by the simple foot actuation of a treadle in the equipment chosen for illustration, to drop emptied flats from a trap-door support at the candling station to a disposal point; and this operation automatically initiates a further feed cycle of the conveyor, whereby a succeeding flat and set of eggs thereon are advanced to the candling station.

Regardless of the specific nature of the trap-door means employed to drop the empty flats, use of the hands of the candler is dispensed with in the control of the equipment, so that full time and attention may be devoted to egg candling work. In accordance with the invention the control functions are preferably performed through the agency of suitable electrical switches associated with the trap-door tray support and conveyor and wired to an electrical drive motor for the latter.

It is a general object of the invention to provide article handling apparatus of the above described sort which is rugged and reliable and, above all, is very compact in nature so as to occupy a minimum of floor space, as well as being capable of being operated at high output capacity by a minimum personnel.

Specifically, the apparatus comprises a standard having an endless belt conveyor appropriately mounted thereon to have its upper reach supported thereby. The surface of the belt is subdivided into segments by cross pieces between which egg containing flats or trays are placed by a loader, and the trays are successively advanced to and discharged onto a pair of pivotally mounted trap-door plates by the conveyor subdivisions. The conveyor is powered by a suitable reduced speed motor drive, the trap-door plates are downwardly retracted by the candler by actuation of a foot controlled treadle, to drop and stack empty trays beneath the plates after their eggs are candled, and switches controlled respectively by the conveyor cross pieces and by the trap-door plates govern termination of a conveyor advancing motor cycle upon the discharging of a filled tray onto the latter and upon the dropping of an emptied tray onto the stack. Spring means return the plates to supporting position immediately following the dropping of a tray and an automatic emergency limit switch is also provided to interrupt the motor drive when a filler flat is deposited at the trap-door support and conveyor advance is not automatically ended by the conveyor controlled switch referred to above.

As many as eight candling stations may be serviced by a single supply attendant, using the improved equipment, whose duties are simply to remove egg containing filler flats from a crate, to deposit the same upon the conveyor units supplying the respective stations, and to perform other supply and disposal functions relating to the egg packing materials involved in the candling operation. The design of the apparatus is such that it does not intrude itself unduly into the space of the candling station, and it is such that it may be associated with other types of conveyor equipment for the subsequent removal of filled egg cartons and other packaging materials, such as means to return empty filler flats and filled cartons from the candling station to the supply end of the equipment.

The foregoing statements are indicative in a general way of the nature of the invention. Other and more specific objects will be apparent to those skilled in the art upon a full understanding of the construction and operation of the apparatus.

A single embodiment of the invention is presented herein for purpose of illustration, and it will be appreciated that the invention may be incorporated in other modified forms coming equally within the scope of the appended claims.

In the drawings:

Fig. 1 is a top plan view illustrating the general relationship of the improved machine's belt conveyor and trap-door tray supporting means at a candling station;

Fig. 2 is a view in side elevation also showing the general layout of parts of the equipment, the trap-door provisions at the candling station being in operative supporting position;

Fig. 3 is a view in end elevation, as viewed from the left of Fig. 2 along line 3—3;

Fig. 4 is a fragmentary view in transverse vertical section along line 4—4 of Fig. 2, showing the conveyor and motor driven operating provisions therefor;

Fig. 5 is an enlarged fragmentary view in section along line 5—5 of Fig. 1, illustrating the cross bar means to subdivide the longitudinally moving surface of the conveyor of the apparatus;

Fig. 6 is a view, in horizontal section along a line corresponding to line 6—6 of Fig. 2, showing a vertically adjustable tray receiving table located beneath the trap-door device at the candling station;

Fig. 7 is a fragmentary sectional view in enlarged scale along horizontal line 7—7 of Fig. 6, illustrating adjusting means for the table of Fig. 6;

Fig. 8 is a view in horizontal section along line 8—8 of Fig. 2, showing an auxiliary table frame and an actuating treadle for the trap-door device;

Fig. 9 is a fragmentary view in transverse vertical section along 9—9 of Fig. 2, illustrating details of the article advancing conveyor at the discharge pulley end thereof;

Figure 13:
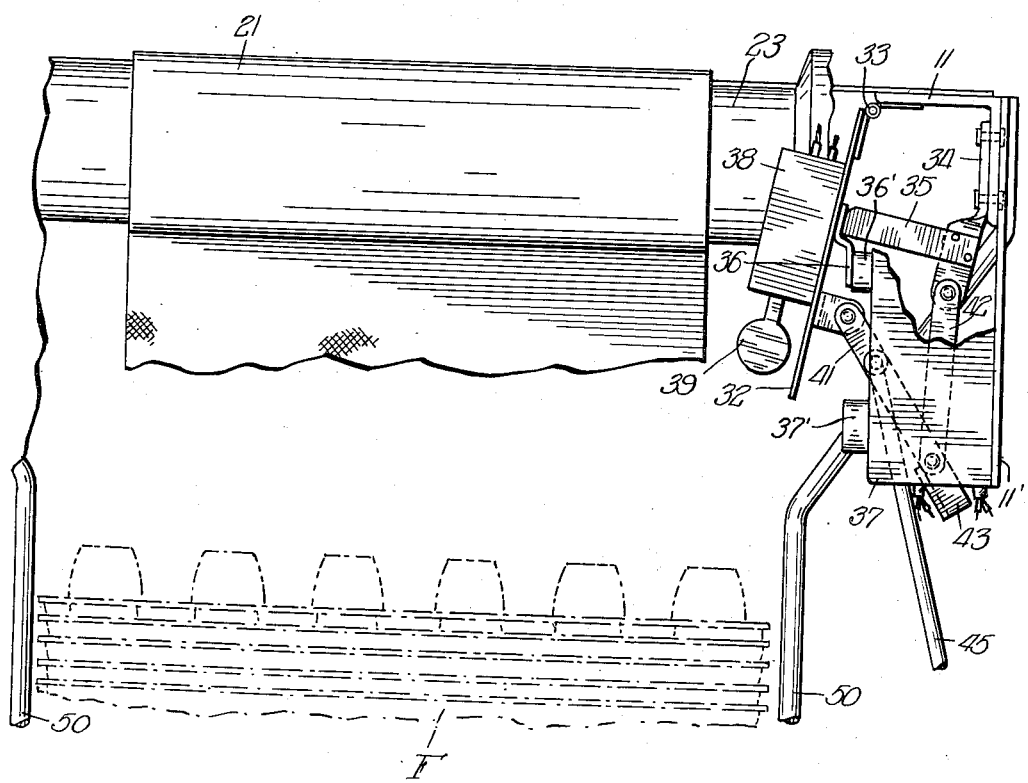

Fig. 10 is a fragmentary view, in end elevation from the forward or discharge end of the apparatus, illustrating on an enlarged scale the mechanism for controlling one of the constituent plates of the trap-door device at the candling station, together with associated provisions for governing a motor driving cycle by dropping of the trap-door plate, the latter being shown in horizontal, article supporting position and its toggle actuating linkage being straightened;

Figs. 11 and 12, are, respectively, views in section along lines 11—11 and 12—12 of Fig. 10 of further details of the trap-door linkage referred to above; and Fig. 13 is an enlarged fragmentary view in end elevation similar to Fig. 10, but illustrating the trap-door arrangement in an actuated, downwardly retracted, tray-dropping position of one of the trap-door plates thereof.

Referring first to Figs. 1 through 4 of the drawings, the improved machine comprises a suitable supporting framework 10, which may be of angle iron construction, for an endless belt conveyor, the frame including parallel horizontal side bars 11 supported by pairs of front and rear upright legs 12, 13 welded thereto. These legs may be braced transversely or longitudinally as desired, and the rear pair of legs carries an auxiliary supporting sub-frame and table unit 14 beneath the side bars, on which driving means for the apparatus are mounted.

The driving provisions comprise a drive motor 15 equipped with a control switch or relay 16 by which initiation and termination of its operation are governed. The control is of a suitable conventional type, by which motor 15 is automatically energized upon dropping of a trap-door support of a candling station at the remote end of the apparatus and deenergized, also preferably automatically, when a loaded egg filler flat or tray is delivered to the candling station. Such de-energization is accomplished in the illustrated unit by belt conveyor controlled switch means or by automatic, article controlled limit switch means, to be more fully described.

A suitable speed reduction unit 17 (Figs. 2 and 4), belt-driven from motor 15, has a sprocket 18 connected by a drive chain with a further sprocket 19 on the shaft of a rear conveyor belt pulley 20. Pulley 20 is of relatively large diameter and has a wide endless conveyor belt 21 trained thereabout, the upper reach of the belt being fully supported in its longitudinal forward travel by a horizontal sheet metal table 22.

This table is supported by and appropriately secured on the longitudinal side bars 11; it extends the entire length of the upper belt reach between its rear pulley 20 and a forward pulley 23 immediately adjacent the trap-door device referred to above, which is generally designated 24. In use the device 24 is located within a candling station attended by an operator; accordingly to enable the space to be darkened and to avoid intrusion in the small available space in the station, and thus in turn to avoid interference with the dropping of empty filler flats by trap-door device 24 to a disposal point, the forward pulley 23 is made of relatively small diameter. Hence it may be positioned immediately at the rear of the trap-door unit, bringing the upper conveyor reach on a level with the latter and closely adjacent thereto.

Belt conveyor 21 has a succession of longitudinally spaced, transversely extending divider bars 25 suitably secured thereon. Their length is only slightly less than the width of the belt, and they have upwardly and rearwardly inclined pins 26 spaced therealong (Fig. 5) for the purpose of assisting in the proper locating of the filled flat or tray F on the belt by a loading attendant at the rear of the machine. A longitudinally extending upright side guide 27 is fixedly secured along one side of belt supporting table 22 for the same purpose, the egg bearing filler flats F being deposited on conveyor belt 21 with their side edge against guide 27 and with a rear transversely extending row of the cells thereof registered against a cross bar 25. An idler roller 21' is appropriately pivoted on the frame to permit adjustment of and then maintain conveyor belt tension.

An automatic conveyor stop switch 28 shown in Fig. 2, is mounted beneath belt 21 on a frame supported bracket 29 and rearwardly extending spring support arm 30, and its actuator finger piece 30' is adapted to be engaged by each of the crossbars 25 as the conveyor passes around forward pulley 23, depositing a filled flat F on trap-door device 24. Switch 28, normally closed one, is opened by this engagement and is appropriately connected to the motor 15 as through switch 16, so as to de-energize the former when so engaged. The motor is re-energized upon the actuation of the device 24 to be described.

Details of trap-door device 24 are best illustrated in Figs 10 and 13, considered in conjunction with Figs. 1, 2 and 3. It comprises a pair of trap-door plates 32, 32' which are actuated by identical treadle controlled linkages, which are accordingly designated as to their parts by corresponding reference numerals.

Each of the trap-door plates is pivotally connected by a hinge 33 to the forward extremity of a frame side bar 11, being capable of an approximate 90° swing downwardly about that hinge. A bracket 34 fixed on side bar 11 carries an inwardly extending stop arm 35 which is engaged by the plate in its downwardly swung position (Fig. 13) to limit its movement. The trap-door plate 32 on one side of the machine is also provided with a projecting switch actuating dog 36 on the lower face thereof.

A standard instantaneous start-stop switch 37 is mounted on a depending plate 11' secured to the frame side bar 11 adjacent trap-door plate 32, the "start" button 36' of the switch being engaged and depressed by dog 36 when the plate 32 is in the dropped position illustrated in Fig. 13. Switch 37 is appropriately wired to the motor 15, as through relay or switch 16, whereby actuation of the "start" button initiates energization of the motor. The "stop" button 37' of the switch is conveniently accessible for operation by the attendant.

A suitable article controlled emergency limit switch 38, suitably connected electrically to motor 15, is also mounted on the upper surface trap-door plate 32. Its actuator piece 39 is disposed in the longitudinal path of travel of filler flats F on the the conveyor, and is struck by a flat to halt conveyor belt 21 in the event of failure of switch 28 to terminate operation of the conveyor under the control of the latter. Details of the wiring of the various switches and motor will be well known to those skilled in the art.

The operation of trap-door plates 32, 32' is controlled by like linkages 40 which each include a link 41 pivoted on a bracket on the lower side of the trap-door plate, and also pivoted adjacent its other end to a link 42. Link 42 is in turn pivoted on the lower end of the frame supported bracket 34. Link 41 has an outer extension arm 43 of angled outline (see Fig. 12) secured thereto. Accordingly, when the links 41, 42 are straightened, i. e., in the position of Fig. 10 in which trap-door plates 32, 32' are sustained horizontally, link 42 engages the horizontal flange portion 44 of extension 43, thereby limiting further upward movement of the plate and, in effect, constituting a toggle joint sustaining the latter.

An elongated, downwardly extending pull rod 45 is pivoted to link 41, between the end pivots of the latter, and this pull rod extends to a pivoted connection with a foot treadle 46 (Figs. 2, 3, 8 and 10). Treadle 46 is appropriately pivoted on the front framework uprights 12, extending forwardly of the latter, and a pair of coil tension springs 47 connected between the treadle and uprights urge the former in clockwise direction, thus urging linkages 40 in a direction to elevate plate 32, 32' to operative position shown in Figs. 1, 2, 3 and 10, in which they receive and support a loaded egg filler flat or tray.

The apparatus also includes provisions to receive empty fillers F as they are discharged from trap-door device 24 upon pedal or treadle actuated, downward dropping of plates 32, 32'. For this purpose an auxiliary supporting frame or table 48 is fixed on the main framework as a forward extension of the front and bottom thereof. This auxiliary frame is sustained by rear diagonals 49 and a pair of upright rods 50 are supported on the outer corners thereof. Uprights 50 have welded divergent arms 51 fixedly secured to the upper frame side bars 11, so as to constitute upright supports and guides for an adjustable skeleton supporting table, illustrated per se in Fig. 6 and designated 52.

Table 48 is provided with a pair of tubular guide sleeves 53 which slidingly engage the respective rod guides 50, and the sleeves are each equipped with a split clamping jaw 54 which is tightened by a finger piece 55 to hold the table rigidly in a vertically adjusted position on rods 50. Accordingly, table 52 will accommodate the desired size of stack of empty filler flats F deposited on table 52 by the dropping of trap-door plates 32, 32'. In order to properly position the bottom-most filler so dropped, the table is provided with a pair of transverse bars 56 (Fig. 6) adapted to upwardly engage and register in clefts between cup formations of the flat, the stack thereafter building up by nested engagement of successively dropped articles.

In operation, assuming that a capacity number of filled flats F are deposited on belt 21 by an attendant at the rear of the apparatus and that trap-door plates 32, 32' are horizontal, operation is initiated by manual depression of the "start" button of switch 37 at the candling station at the forward end of the apparatus. This energizes motor 15 to advance conveyor belt 21 one cycle, the belt automatically halting at the end of the cycle when a receding conveyor cross bar 25 actuates switch 28. Thus the forward-most filler flat or tray is positioned on trap-door support plates 32, 32'. It is to be noted by reference to Figs. 2, 9 and 13 that the small diameter forward belt pulley 23 is so located that the conveyor discharges onto the plates substantially in the plane thereof and that, though the pulley is located closely adjacent the rear of plates 32, 32' it is not projected at all into the candling space, nor does it diminish the space beneath the plates through which empty filler flats are to be dropped.

The candler proceeds to candle the eggs, removing the same progressively, from a forward row of cells of filler flat F to a rear row, and placing acceptable eggs into cartons, which when filled are disposed of in an appropriate fashion. When a flat has been emptied, the operator quickly depresses treadle 46 by which the toggle linkages 40 are broken to the downwardly retracted position shown in Fig. 13. The flat drops onto a stack on table 52 below, as illustrated in dotted lines in Fig. 13 and, as the plates 32, 32' reach their lowest position of that figure, the dog 36 on plate 32 engages and depresses the "start" button of switch 37 to re-energize conveyor drive motor 15.

The treadle is actuated and then released quickly, so that plates 32, 32' are returned immediately under the influence of springs 47 to their horizontal article supporting position of Fig. 10. The moving conveyor advances a succeeding filled flat onto the plates and, having positioned the same thereon, halts its own movement by engaging switch 28. If for any reason switch 28 should not be actuated in this manner, the advance of the belt is nevertheless emergency-halted by engagement of the filled flat with limit switch 38, without possibility of damage to the flat or its contents.

The unit is simple and inexpensive in its parts, yet reliable and unfailing in action. It enables a candling operator to devote all of her attention to the operation of candling alone, freeing her arms for this purpose. As will occur to those skilled in the art, it is also practical and feasible to associate with the equipment means for the automatic re-initiation of the advance of the conveyor upon dropping of an empty tray, so that the candler may be relieved of even the need to operate a treadle. The requirements of a number of candlers can be supplied by a single operator at the rear supply end of the apparatus representing a savings in operation of the establishment. This equipment is compact in size, occupying a minimum of floor space and, furthermore, being sufficiently narrow that the candling stations can be located close to one another and be serviced in a minimum size over-all area.

I claim:

1. Article handling equipment comprising a horizontally movable conveyor, means constituting a station to which said conveyor advances articles comprising a retractable support onto which said articles are delivered successively by said conveyor, means operatively connected to said support to cause retraction thereof, attended by dropping of an article therefrom to a disposal point, and means to actuate said conveyor for intermittent longitudinal movement, comprising means to move the conveyor, means to halt movement of said conveyor after an article is delivered onto said support, and means actuated by said support in retracted position of the latter to cause re-initiation of article advancing movement of the conveyor.

2. Apparatus in accordance with claim 1 in which said conveyor moving means comprises an electrically energizable motor operatively connected to the conveyor, and in which said means to cause re-initiation of movement of the conveyor comprises a switch electrically connected with said motor and engaged and actuated by said support in said retracted position thereof.

3. Apparatus in accordance with claim 1 in which said conveyor moving means comprises an electrically energizable motor operatively connected to the conveyor, and in which said means for halting and re-initiating movement of the conveyor comprise, respectively, a switch controlled by the conveyor and electrically connected with said motor and a switch electrically connected with said motor and engaged and actuated by said support in said retracted position thereof.

4. Article handling equipment comprising an endless, longitudinally travelling conveyor, means constituting a station to which said conveyor advances articles, comprising a vertically retractable support onto which said articles are delivered by said conveyor, manually actuated means operatively connected to said support to cause retraction thereof, attended by dropping of an article therefrom to a disposal point, and means to actuate the conveyor for intermittent longitudinal movement, comprising means to move the same, means to halt movement of said conveyor when an article is delivered onto said support, and means actuated by said support in vertically retracted position of the latter to re-initiate longitudinal, article advancing movement of the conveyor.

5. Article handling equipment comprising a horizontal longitudinally travelling conveyor, means constituting a station to which said conveyor advances articles, comprising a base mounting a vertically retractable support onto which said articles are delivered by said conveyor, means operatively connected to said support to cause vertical retraction thereof, attended by dropping of an article therefrom to a disposal point, and means to actuate said conveyor for intermittent longitudinal movement comprising means to move the same, means to halt movement of said conveyor when an article is delivered onto said support and means actuated by said support in retracted position thereof to reinitiate longitudinal, container advancing movement of the conveyor.

6. Apparatus in accordance with claim 5, in which said conveyor actuating means further comprises an electrically energizable motor operatively connected to the conveyor, and in which said means re-initiating movement of the conveyor comprises a switch electrically connected with said motor and engaged and actuated by said support in said retracted position thereof.

7. Article handling equipment comprising a horizontal longitudinally travelling conveyor, means constituting a station to which said conveyor advances articles, comprising a base mounting a pair of opposed pivoted and vertically retractable support plates in coplanar relation onto which said articles are delivered by said conveyor, means operatively connected to said support to cause vertical retraction thereof, attended by dropping of an article therefrom to a disposal point, and means to actuate said conveyor for intermittent longitudinal movement, comprising means to move the same, means to halt movement of said conveyor when an article is delivered onto said support plates and means actuated by one of said support plates in retracted position thereof to re-initiate longitudinal, container advancing movement of the conveyor.

8. Apparatus in accordance with claim 7, in which said conveyor actuating means further comprises an electrically energizable motor operatively connected to the conveyor, and in which said means re-initiating movement of the conveyor comprises a switch electrically connected with said motor and engaged and actuated by said one of said support plates in said retracted position thereof.

9. Article handling apparatus comprising an operating station, a downwardly retractable table plate mounted at said stations, means releasably sustaining the plate in horizontal position to receive and support articles, and an endless, longitudinally travelling conveyor, means to actuate the conveyor for intermittently delivering articles to said station, said conveyor comprising a belt trained about a rear pulley remote from the station which is of relatively large diameter and a forward discharge pulley immediately at the rear of said plate which is of relatively small diameter, the upper reach of said belt being substantially coplanar with said plate at said relatively small discharge pulley when said plate is at its uppermost position, and means responsive to movement of said plate for controlling the movement of said belt.

10. Article handling apparatus comprising an operating station, a downwardly retractable table plate mounted at said station, means releasably sustaining the plate in horizontal position to receive and support articles, an endless, longitudinally travelling conveyor delivering articles to said station, said conveyor comprising a belt trained about a rear pulley remote from the station which is of relatively large diameter and a forward discharge pulley immediately at the rear of said plate which is of relatively small diameter, the upper reach of said belt being substantially coplanar with said plate at said relatively small discharge pulley when said plate is in its uppermost position, means adjacent said table plate actuated by predetermined movement of said belt to halt the movement of said belt, and means actuated by said plate in the downwardly retracted position thereof to reinitiate the movement of said belt.

References Cited in the file of this patent
UNITED STATES PATENTS

| | | |
|---|---|---|
| 986,218 | Rector | Mar. 7, 1911 |
| 1,938,104 | Jennings | Dec. 5, 1933 |
| 2,130,171 | Zsamboky | Sept. 13, 1938 |
| 2,519,153 | Roura | Aug. 15, 1950 |
| 2,542,200 | Kraeger | Feb. 20, 1951 |
| 2,639,049 | Kinzelman et al. | May 19, 1953 |
| 2,686,603 | Lawson | Aug. 17, 1954 |